United States Patent
Zhao

(10) Patent No.: US 9,886,504 B2
(45) Date of Patent: Feb. 6, 2018

(54) AUDIO FILE MANAGEMENT METHOD, DEVICE AND STORAGE MEDIUM

(71) Applicant: GuangZhou KuGou Computer Technology Co.Ltd., Guangzhou (CN)

(72) Inventor: Weifeng Zhao, Shenzhen (CN)

(73) Assignee: GuangZhou KuGou Computer Technology Co.Ltd, Guangzhou (CN)

( * ) Notice: Subject to any disclaimer, the term of this patent is extended or adjusted under 35 U.S.C. 154(b) by 0 days.

(21) Appl. No.: 15/153,183

(22) Filed: May 12, 2016

(65) Prior Publication Data
US 2016/0259852 A1 Sep. 8, 2016

Related U.S. Application Data

(63) Continuation of application No. PCT/CN2014/091195, filed on Nov. 14, 2014.

(30) Foreign Application Priority Data

Nov. 15, 2013 (CN) .......................... 2013 1 0574026

(51) Int. Cl.
*G06K 9/00* (2006.01)
*G06F 17/30* (2006.01)
(Continued)

(52) U.S. Cl.
CPC .... *G06F 17/30778* (2013.01); *G06F 17/3025* (2013.01); *G06F 17/30749* (2013.01);
(Continued)

(58) Field of Classification Search
CPC ........... G06F 17/30778; G06F 17/3025; G06F 17/30749; G06F 17/30243; G06T 7/408;
(Continued)

(56) References Cited

U.S. PATENT DOCUMENTS 5,475,835 A * 12/1995 Hickey ..................... G06F 3/16
340/12.53
8,601,372 B1 * 12/2013 Gentile ................. G06F 3/0484
715/202
(Continued)

FOREIGN PATENT DOCUMENTS

| CN | 101609703 A | 12/2009 |
| CN | 101702316 A | 5/2010 |

(Continued)

OTHER PUBLICATIONS

International Search Report in international application No. PCT/CN2014/091195, dated Feb. 17, 2015.
(Continued)

*Primary Examiner* — Amir Alavi
(74) *Attorney, Agent, or Firm* — Oppedahl Patent Law Firm LLC

(57) ABSTRACT

The embodiments of the disclosure provide a method and device for audio file management and a storage medium. The method may include that: an album image corresponding to an audio file to be managed is acquired (S101); color analysis is performed on the album image to obtain a characteristic color of the album image (S102); a color label is set for the audio file according to the characteristic color of the album image (S103); and the audio file is managed according to the color label of the audio file (S104). According to the embodiments of the present disclosure, the audio file may be managed on the basis of colors, so that diversity and intelligence of the means of audio file management are improved.

20 Claims, 8 Drawing Sheets

(51) Int. Cl.
*G11B 27/32* (2006.01)
*G06K 9/62* (2006.01)
*G06T 7/90* (2017.01)

(52) U.S. Cl.
CPC .............. *G06K 9/6267* (2013.01); *G06T 7/90* (2017.01); *G11B 27/322* (2013.01)

(58) Field of Classification Search
CPC ..................... G06T 7/90; G06T 7/0081; G06T 2207/10024; G06K 9/6267; G06K 9/4652; G11B 27/322
See application file for complete search history.

(56) References Cited

U.S. PATENT DOCUMENTS

| | | | | |
|---|---|---|---|---|
| 2004/0220791 | A1* | 11/2004 | Lamkin | G06F 17/30017 703/11 |
| 2007/0094583 | A1* | 4/2007 | Randall | H04N 21/440218 715/234 |
| 2007/0226260 | A1* | 9/2007 | Williams | G06F 17/30056 |
| 2009/0019398 | A1* | 1/2009 | Hansson | G06F 17/30265 715/838 |
| 2014/0180818 | A1* | 6/2014 | Mistler | G06Q 30/0259 705/14.57 |
| 2016/0259852 | A1* | 9/2016 | Zhao | G11B 27/322 |

FOREIGN PATENT DOCUMENTS

| | | |
|---|---|---|
| CN | 101727943 A | 6/2010 |
| CN | 101958138 A | 1/2011 |
| CN | 102509084 A | 6/2012 |

OTHER PUBLICATIONS

English Translation of the Written Opinion of the International Search Authority in international application No. PCT/CN2014/091195, dated Feb. 17, 2015.

Notification of the First Office Action of Chinese application No. 201310574026.2, dated Sep. 17, 2015.

* cited by examiner

AUDIO FILE MANAGEMENT METHOD, DEVICE AND STORAGE MEDIUM

CROSS REFERENCE TO RELATED APPLICATIONS

This is a continuation application of International Patent Application No. PCT/CN2014/091195, filed on Nov. 14, 2014, which claims priority to Chinese Patent Application No. 201310574026.2, filed on Nov. 15, 2013 by Tencent Technology (Shenzhen) Co., Ltd. and titled with "Method and Device for Audio File Management", the entire contents of which are incorporated herein by reference.

TECHNICAL FIELD

The embodiments of the present disclosure relate to the technical field of Internet, specifically relate to the technical field of audio processing, and in particular to a method for audio file management and device and a storage medium.

BACKGROUND

At present, an audio file management solution is mainly based on existing basic information of an audio file, for example: the audio file may be managed on the basis of a genre of the audio file; or, the audio file may be managed on the basis of information about a singer performing the audio file. However, managing an audio file on the basis of a colour is a direction which is ignored at present. In general, a colour may represent a style attribute of an audio file to a certain extent, for example: a dark colour may represent an audio file of a melancholy style, and a bright colour may represent an audio file of a happy style, and the like. Along with increase of the number of audio files, how to manage the audio files on the basis of colours becomes a technical problem urgent to be solved.

SUMMARY

The embodiments of the present disclosure provide a method and device for audio file management and a storage medium, which may manage an audio file on the basis of a colour and improve diversity and intelligence of the means of audio file management.

According to a first aspect of the embodiments of the present disclosure, a method for audio file management is provided, which may include that:

an album image corresponding to an audio file to be managed is acquired;

colour analysis is performed on the album image to obtain a characteristic colour of the album image;

a colour label is set for the audio file according to the characteristic colour of the album image; and the audio file is managed according to the colour label of the audio file.

According to a second aspect of the embodiments of the present disclosure, a device for audio file management is provided, which may include:

an image acquisition module, configured to acquire an album image corresponding to an audio file to be managed;

a colour analysis module, configured to perform colour analysis on the album image to obtain a characteristic colour of the album image;

a label setting module, configured to set a colour label for the audio file according to the characteristic colour of the album image; and an audio management module, configured to manage the audio file according to the colour label of the audio file.

According to a third aspect of the embodiments of the present disclosure, a storage medium including a computer-executable instruction is provided, the computer-executable instruction being executed by a computer processor to execute a method for audio file management, the method including that:

an album image corresponding to an audio file to be managed is acquired;

colour analysis is performed on the album image to obtain a characteristic colour of the album image;

a colour label is set for the audio file according to the characteristic colour of the album image; and the audio file is managed according to the colour label of the audio file.

The embodiments of the present disclosure have beneficial effects as follows:

according to the embodiments of the present disclosure, the colour label of an audio file may be set according to the characteristic colour of an album image corresponding to the audio file, and the audio file may be managed on the basis of the colour label; and since the characteristic colour of the album image may reflect the style attribute of the corresponding audio file to a certain extent, managing the audio file on the basis of the colour label including the characteristic colour effectively improves the diversity and intelligence of the means of audio file management.

BRIEF DESCRIPTION OF THE DRAWINGS

In order to describe technical solutions in embodiments of the present disclosure or a conventional art more clearly, the drawings required by description about the embodiments or the conventional art will be simply introduced below. Obviously, the drawings described below are only some embodiments of the present disclosure, and those skilled in the art may also obtain other drawings according to these drawings without creative work.

DETAILED DESCRIPTION

The technical solutions in the embodiments of the present disclosure will be clearly and completely described below with reference to the drawings in the embodiments of the present disclosure. Obviously, the described embodiments are not all embodiments but only a part of embodiments of the present disclosure, and are intended to describe a principle of the present disclosure rather than limit the present disclosure to these specific embodiments. All the other embodiments obtained by those skilled in the art on the basis of the embodiments in the present disclosure without creative work shall fall within the scope of protection of the present disclosure.

In the embodiments of the present disclosure, an audio file may include, but not limited to: a file such as music, a music clip or a voice clip, wherein the music includes, but not limited to: a song with an accompaniment, a cappella song or performed music, while the music clip correspondingly includes, but not limited to: a song clip with an accompaniment, a cappella song clip or a performed music clip.

A method for audio file management provided by the embodiments of the present disclosure will be introduced below with reference to FIG. 1 to FIG. 3 in detail. It is to be noted that the method for audio file management shown in FIG. 1 to FIG. 3 may be executed by a device for audio file management provided by an embodiment of the present disclosure, and the device for audio file management may operate in terminal equipment or a server, wherein the terminal equipment may include, but not limited to: a Personal Computer (PC), a PAD, a mobile phone, a smart phone and a notebook computer and other equipment.

Figure 1:
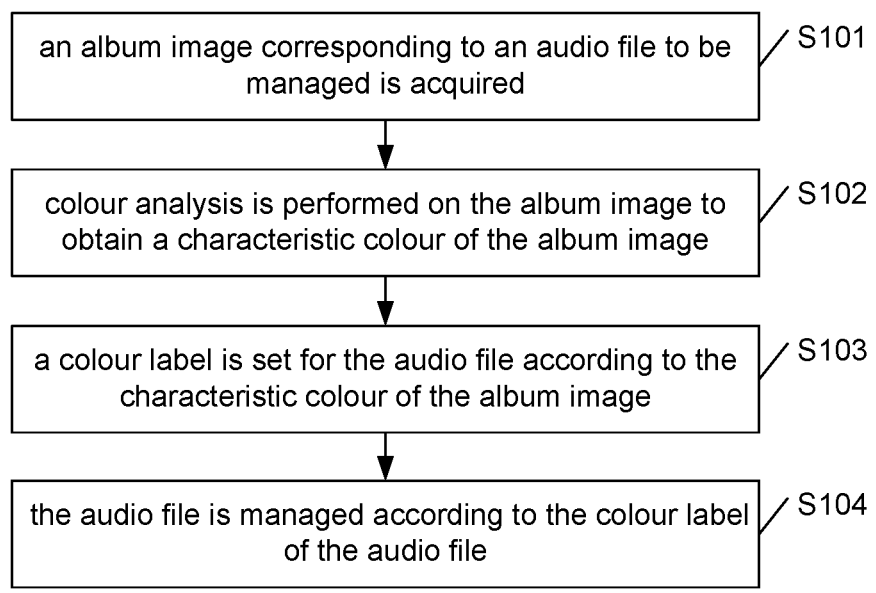
FIG. 1 is a flowchart of a method for audio file management according to an embodiment of the present disclosure.

FIG. 1 is a flowchart of a method for audio file management according to an embodiment of the present disclosure. The method may include the following step S101 to step S104.

S101: an album image corresponding to an audio file to be managed is acquired.

Here, the album image corresponding to the audio file refers to any picture of an album to which the audio file belongs. In this step, the album image corresponding to the audio file to be managed may be acquired from a network, and preferably, the album image acquired in this step may refer to a cover picture of the album to which the audio file belongs, or may refer to a picture selected for the audio file in the album to which the audio file belongs.

In addition, in the embodiment of the present disclosure, an image library may also be locally created in advance, and there is stored an album image corresponding to at least one audio file in the image library. The step that the album image corresponding to the audio file to be managed is acquired may specifically be implemented as follows: the album image corresponding to the audio file to be managed is queried in the local album image library; and if querying fails, the album image corresponding to the audio file to be managed is acquired from other equipment through network.

S102: colour analysis is performed on the album image to obtain a characteristic colour of the album image.

The characteristic colour of the album image may be for reflecting a basic colour of the album image. The characteristic colour of the album image may reflect a style attribute of the corresponding audio file to a certain extent, for example, an image in a dark colour (such as black and/or grey) is usually selected as an album image of an audio file of a melancholy style; an image in a neutral colour (such as blue and/or green) is usually selected as an album image of an audio file of a quiet and relaxed style; and an image in a bright colour (such as red and/or yellow) is usually selected as an album image of an audio file of a happy style. In this step, colour analysis is performed on the album image to determine the characteristic colour of the album image.

The step that colour analysis is performed on the album image to obtain the characteristic colour of the album image may specifically be implemented as follows:

colour analysis is performed on the album image corresponding to the audio file to be managed to obtain at least one colour included in the album image; and one of the obtained at least one colour is directly selected as the characteristic colour of the album image, or the obtained at least one colour is mapped into at least one preset colour according to a set mapping relationship, and one of the at least one colour obtained by mapping is selected as the characteristic colour of the album image.

S103: a colour label is set for the audio file according to the characteristic colour of the album image.

Here, the colour label includes the characteristic colour of the album image; for example, if the characteristic colour of the album image is green, a green colour label is set for the audio file; or, if the characteristic colour of the album image is red, a red colour label is set for the audio file.

S104: the audio file is managed according to the colour label of the audio file.

Since the characteristic colour of the album image may reflect the style attribute of the corresponding audio file to a certain extent, in this step, managing the audio file on the basis of the colour label of the audio file may actually be considered as managing the audio file on the basis of the style attribute of the audio file, and such a colour-label-based management manner effectively extends the conventional means of audio file management and improves diversity and intelligence of audio file management.

Figure 2:
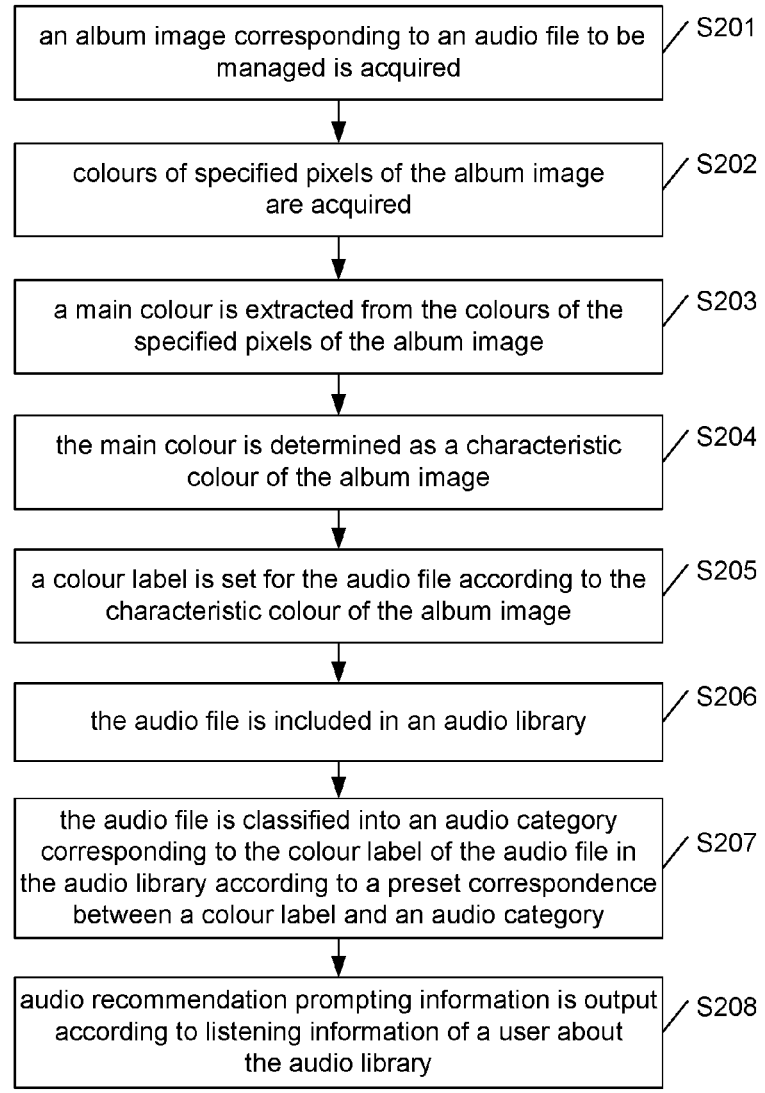
FIG. 2 is a flowchart of another method for audio file management according to an embodiment of the present disclosure.

FIG. 2 is a flowchart of another method for audio file management according to an embodiment of the present disclosure. The method may include the following steps S201 to S208.

S201: an album image corresponding to an audio file to be managed is acquired.

S201 in the embodiment may refer to S101 in the embodiment shown in FIG. 1, and will not be elaborated herein.

S202: colours of specified pixels of the album image are acquired.

The album image consists of multiple pixels which are arranged according to information such as positions and colours. Here, a colour of each pixel of the album image may be represented in a Red Green Blue (RGB) format, for example, a colour value of the first pixel of the album image may be represented as $(r_1, g_1, b_1)$, a colour value of the second pixel of the album image may be represented as $(r_2, g_2, b_2)$, and by parity of reasoning, a colour value of the nth (n is a positive integer) pixel of the album image may be represented as $(r_n, g_n, b_n)$. In this step, all the pixels of the album image may be determined as specified pixels, and a part of pixels of the album image may also be determined as specified pixels.

S203: a main colour is extracted from the colours of the specified pixels of the album image.

Here, the main colour may be for reflecting a basic colour of the album image. In the step, a preset number of colours may be extracted from the colours of the specified pixels of the album image as main colours using a colour histogram algorithm; a preset number of colours may also be extracted from the colours of the specified pixels of the album image as the main colours using a clustering algorithm, for example, a K-Nearest Neighbour (KNN) algorithm. Here, the preset number of colours may be for reflecting the basic colour of the album image, and the basic colour may include a dominant colour and an auxiliary colour. It may be understood that the preset number is less than or equal to the number of the specified pixels, the preset number may be set according to a practical requirement, for example, the preset number may also be set to be M+N, values of M and N being both integers more than or equal to 0, wherein M may represent the number of the colours reflecting the dominant colour of the album image, N may represent the number of the colours reflecting the auxiliary colour of the album image, and the preset number is the sum of the number of the colours reflecting the dominant colour of the album image and the number of the colours reflecting the auxiliary colour. In S204, the main colour is determined as a characteristic colour of the album image.

Since the main colour may be used to reflect the basic colour of the album image, namely, may be used to reflect a basic colour characteristic of the album image, the main colour may be determined as the characteristic colour of the album image in this step.

Steps S202 to S204 in the embodiment may be considered as specific detailed steps of step S102 in the embodiment shown in FIG. 1.

S205: a colour label is set for the audio file according to the characteristic colour of the album image.

S205 in the embodiment may refer to Step 103 in the embodiment shown in FIG. 1, and will not be elaborated herein.

S206: the audio file is included in an audio library.

Here, the audio library refers to a database for storing audio files, and the audio library may refer to an audio library located in a storage space of a network server, or may also refer to an audio library located in a storage space of terminal equipment. Since the colour label has been set for the audio file, an inclusion process in this step may adopt the following two implementation modes according to a practical condition of the audio library: one implementation mode is that if the audio file has been included in the audio library, the inclusion process in this step may include that the colour label is added to the audio file in the audio library; and the other implementation mode is that if the audio file has not been included in the audio library, the inclusion process in this step may include that the audio file with the colour label is stored into the audio library.

S207: the audio file is classified into an audio category corresponding to the colour label of the audio file in the audio library according to a preset correspondence between a colour label and an audio category.

Here, the preset correspondence between a colour label and an audio category is that: one colour label corresponds to one audio category. It may be understood that there may exist multiple audio files in the audio library, and each audio file may be classified in S207 according to the colour label of each audio file, thereby implementing classified management over the whole audio library on the basis of the colour label of each audio file.

Steps S206 to S207 in the embodiment may be considered as specified detailed steps of S104 in the embodiment shown in FIG. 1.

S208: audio recommendation prompting information is output according to listening information of a user about the audio library.

It is to be noted that the audio recommendation prompting information may be used to prompt the user to listen to a recommended audio file. In this step, the audio recommendation prompting information is output according to the listening information of the user about the audio library, so that a recommended audio is more consistent with a listening habit of the user, and recommendation accuracy is improved. During specific implementation, the step may specifically include the following step A to step D:

Step A: listening information of the user about the audio files in the audio library is acquired, the listening information containing the colour labels of the audio files to which the user listens.

An acquisition process in step A may include that: listening records of the user about the audio files in the audio library are recorded at first, that is, the audio files to which the user listen in the audio library are recorded; and then the audio library is searched for the colour label of each audio file to which the user listens to obtain the listening information.

B: an audio category that the user follows is determined according to the colour labels of the audio files to which the user listens in the listening information.

In step B, a statistical algorithm may be adopted to determine the audio category that the user follows, and specifically: in step B, the statistical algorithm is adopted to make statistics about the number of colour labels of each type according to the colour labels of the audio files to which the user listens in the listening information, and an audio category corresponding to the colour labels in the largest number is determined as the audio category that the user follows. For example, if the user listens to 1,000 audio files in the audio library, that is, the listening information contains colour labels of the 1,000 audio files, statistics about the number of colour labels of each type in the 1,000 colour labels may be made in step B, and if a statistical result shows that there are totally 500 green colour labels, 300 red colour labels, 100 blue colour labels, 50 black colour labels and 50 yellow colour labels, the audio category that the user follows may be determined to be an audio category corresponding to the green colour labels.

C: at least one audio file is selected from the audio category that the user follows to generate audio recommendation prompting information.

In step C, at least one audio file may be randomly selected from the audio category that the user follows to generate audio recommendation prompting information; or, at least one specified audio file may also be selected from the audio category that the user follows to generate audio recommendation prompting information according to an operation requirement.

D: the audio recommendation prompting information is output.

It is to be noted that the user may listen to the recommended audio file according to the audio recommendation prompting information after the audio recommendation prompting information is output in step D.

It may be understood that step S208 is a specific application based on a colour analysis process of the embodiment of the present disclosure and the colour label of the audio file, and during specific implementation, the embodiment of the present disclosure may also implement other applications, including, but not limited to: (1) a listening prompt is output for the user according to the listening habit of the user, and for example: if the user listens to 10 songs, colour labels may be set for the 10 songs on the basis of the colour analysis process of the embodiment of the present disclosure respectively, and if red colour labels are set for 5 songs, green colour labels are set for 2 songs and blue colour labels are set for 3 songs, the listening prompt may be output for the user to prompt the user that colours of his/her favourite songs are red; (2) a social user is recommended for the user according to the listening habit of the user, for example: after a colour of a favourite audio file of the user is determined on the basis of the colour analysis process of the embodiment of the present disclosure, each social network may be searched for other users fond of audio files of the same colour to recommend said other users to the user; (3) character analysis information is pushed to the user according to the listening habit of the user, for example: after the colour of the favourite audio file of the user is determined on the basis of the colour analysis process of the embodiment of the present disclosure, a network may be searched for a personal character represented by the favourite colour of the user, and character analysis information is generated and pushed to the user; and the like.

Figure 3:
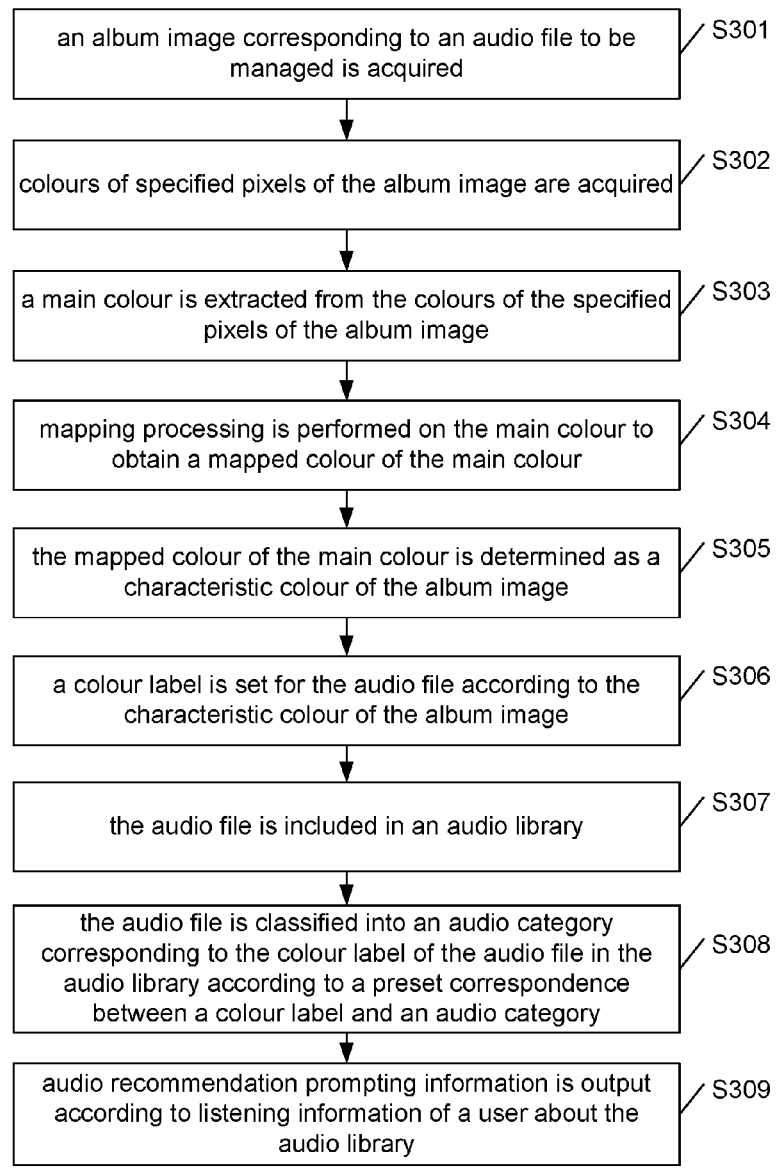
FIG. 3 is a flowchart of still another method for audio file management according to an embodiment of the present disclosure.

FIG. 3 is a flowchart of another method for audio file management according to an embodiment of the present disclosure. The method may include the following steps S301 to S309.

S301: an album image corresponding to an audio file to be managed is acquired.

S302: colours of specified pixels of the album image are acquired.

S303: a main colour is extracted from the colours of the specified pixels of the album image.

S301 to S303 in the embodiment may refer to S201 to S203 in the embodiment shown in FIG. 2, and will not be elaborated herein.

S304: mapping processing is performed on the main colour to obtain a mapped colour of the main colour.

In the step, the following two feasible implementation modes may be adopted for the mapping processing of the main colours. In one feasible implementation mode, a mapping processing process in S304 may include the following step E to step G:

E: a first preset colour mapping table is read, the first preset colour mapping table including at least one mapped colour and a colour value range of each mapped colour.

In step E, the number of the mapped colours in the first preset colour mapping table may be set according to a practical requirement, for example: there may be 12 constellation colours, or there may be 7 specified colours (such as red, orange, yellow, green, cyan, blue and purple), and so on. The colour value range of each mapped colour may be represented in an RGB format, for example: a colour value range of a mapped colour green may be represented as $(r_{green}, g_{green}, b_{green})$, $r_{green} \in (r_x, r_y)$, $g_{green} \in (g_x, g_y)$ and $b_{green} \in (b_x, b_y)$, wherein $r_x < r_y$, $g_x < g_y$ and $b_x < b_y$.

F: a colour value of the main colour is acquired.

In step F, the colour value of the main colour may be represented in the RGB format, for example: the colour value of the main colour may be represented as $(r_1, g_1, b_1)$.

G: the main colour is mapped into a mapped colour in the first preset colour mapping table according to the first preset colour mapping table and the colour value of the main colour.

According to the example in step E to step F, in step G, if $r_1 \in (r_x, r_y)$, $g_1 \in (g_x, g_y)$ and $b_1 \in (b_x, b_y)$, the main colour may be mapped into green in the first preset colour mapping table.

It is to be noted that if the main colour includes multiple colours, it is necessary to map each colour included in the main colour into the mapped colours in the first preset colour mapping table when the main colour is mapped into the mapped colour in the first preset colour mapping table in step G.

Specifically, the step that each colour included in the main colour is mapped into the mapped colours in the first preset colour mapping table may include that:

each colour included in the main colour is traversed, and colour value ranges of colour values of the currently traversed colours in the first colour mapping table are determined; and the currently traversed colours are mapped into the mapped colours corresponding to the determined colour value ranges in the first colour mapping table.

In the other feasible implementation mode, the mapping processing process in step S304 may include the following step H to step K:

H: a second preset colour mapping table is read, the second preset colour mapping table including at least one mapped colour and a colour value of each mapped colour.

In step H, the number of the mapped colours in the second preset colour mapping table may be set according to a practical requirement, for example: there may be 12 constellation colours, or there may be 7 specified colours (such as red, orange, yellow, green, cyan, blue and purple), and the like. The colour value range of each mapped colour may be represented in the RGB format, for example: there are totally 2 mapped colours included in the second preset colour mapping table, wherein a colour value of one mapped colour which is green may be represented as $(r_{green}, g_{green}, b_{green})$, and a colour value of the other mapped colour which is red may be represented as $(r_{red}, g_{red}, b_{red})$.

I: a colour value of the main colour is acquired.

In step I, the colour value of the main colour may be represented in the RGB format, for example: the colour value of the main colour may be represented as $(r_1, g_1, b_1)$.

J: a Euclidean distance between the main colour and each mapped colour in the second preset colour mapping table is calculated.

That is, a Euclidean distance between the colour value of the main colour and the colour value of each mapped colour in the second preset colour mapping table is calculated. According to the example in step H to step I, a Euclidean distance between $(r_1, g_1, b_1)$ and each of $(r_{green}, g_{green}, b_{green})$ and $(r_{red}, g_{red}, b_{red})$ is required to be calculated in step J.

K: the mapped colour at the shortest Euclidean distance away from the main colour in the second preset colour mapping table is determined as the mapped colour of the main colour.

According to the example in step J, if the Euclidean distance between $(r_1, g_1, b_1)$ and $(r_{green}, g_{green}, b_{green})$ is shorter than the Euclidean distance between $(r_1, g_1, b_1)$ and $(r_{red}, g_{red}, b_{red})$, the main colour represented as $(r_1, g_1, b_1)$ is mapped into green in the second preset colour mapping table.

The above is the mapping processing process under the condition that the main colour includes one colour, and when the main colour includes multiple colours, the mapping processing process may specifically include the following step G0 to step J0:

G0: the second preset colour mapping table is read, the second preset colour mapping table including at least one mapped colour and the colour value of each mapped colour. Specific description about of this step may refer to the description about Step G.

H0: a colour value of each colour included in the main colour is acquired.

In step H0, the colour value of each colour included in the main colour may be represented in the RGB format, for example: if the main colour includes 2 colours, then a colour value of one colour may be represented as $(r_1,g_1,b_1)$, and a colour value of the other colour may be represented as $(r_2,g_2,b_2)$.

I0: a Euclidean distance between each colour included in the main colour and each mapped colour in the second preset colour mapping table is calculated.

That is, a Euclidean distance between the colour value of the each colour included in the main colour and the colour value of each mapped colour in the second preset colour mapping table is calculated.

According to the examples in step G0 to step H0, in step I, a Euclidean distance between $(r_1,g_1,b_1)$ and each of $(r_{green},g_{green},b_{green})$ and $(r_{red},g_{red},b_{red})$ is required to be calculated, and a Euclidean distance between $(r_2,g_2,b_2)$ and each of $(r_{green},g_{green},b_{green})$ and $(r_{red},g_{red},b_{red})$ is required to be calculated.

J0: for each colour included in the main colour, the mapped colour at the shortest Euclidean distance away from the colour in the second preset colour mapping table is determined as the mapped colour of the colour to obtain the mapped colour of each colour included in the main colour.

According to the example in step I0, if the Euclidean distance between $(r_1,g_1,b_1)$ and $(r_{green},g_{green},b_{green})$ is shorter than the Euclidean distance between $(r_1,g_1,b_1)$ and $(r_{red},g_{red},b_{red})$, the colour represented as $(r_1,g_1,b_1)$ is mapped into green in the second preset colour mapping table; and if the Euclidean distance between $(r_2,g_2,b_2)$ and $(r_{green},g_{green},b_{green})$ is shorter than the Euclidean distance between $(r_2,g_2,b_2)$ and $(r_{red},g_{red},b_{red})$, the colour represented as $(r_2,g_2,b_2)$ is mapped into red in the second preset colour mapping table.

It is to be noted that one of the two implementation modes shown in step S304 or a combination of the two may be flexibly selected for mapping processing according to the practical requirement. Moreover, after mapping processing is performed on the main colour, the obtained mapped colour may be completely different, partially the same or completely the same. For example, according to the example in step J0, if the Euclidean distance between $(r_1,g_1,b_1)$ and $(r_{green},g_{green},b_{green})$ is shorter than the Euclidean distance between $(r_1,g_1,b_1)$ and $(r_{red}, g_{red}, b_{red})$, the colour represented as $(r_1,g_1,b_1)$ is mapped into green in the second preset colour mapping table; and if the Euclidean distance between $(r_2,g_2,b_2)$ and $(r_{green},g_{green},b_{green})$ is also shorter than the Euclidean distance between $(r_2,g_2,b_2)$ and $(r_{red}, g_{red}, b_{red})$, the colour represented as $(r_2,g_2,b_2)$ is mapped into green in the second preset colour mapping table. At this time, although the number of the obtained mapped colours is 2, the two mapped colours are both green, and they have a consistent colour value.

S305: the mapped colour of the main colour is determined as a characteristic colour of the album image.

Here, the mapped colour of the main colour may achieve a better colour display effect compared with the main colour. In the step, the mapped colour of the main colour may be determined as the characteristic colour of the album image, so that a style attribute of the audio file may be pertinently represented with personality, and meanwhile, a better colour display effect may be achieved.

Step S302 to step S305 in the embodiment may be considered as specific detailed steps of step S102 in the embodiment shown in FIG. 1.

S306: a colour label is set for the audio file according to the characteristic colour of the album image.

S307: the audio file is included in an audio library.

S308: the audio file is classified into an audio category corresponding to the colour label of the audio file in the audio library according to a preset correspondence between a colour label and an audio category.

S309: audio recommendation prompting information is output according to listening information of a user about the audio library.

Steps S306 to S309 in the embodiment may refer to steps S205 to S208 in the embodiment shown in FIG. 2, and will not be elaborated herein.

From the description about the embodiments shown in FIG. 1 to FIG. 3, the embodiment of the present disclosure may set the colour label of the audio file according to characteristic colour of the album image corresponding to the audio file, and implement management over the audio file on the basis of the colour label; since the characteristic colour of the album image may reflect the style attribute of the corresponding audio file to a certain extent, managing the audio file on the basis of the colour label including the characteristic colour effectively improves the diversity and intelligence of the means of audio file management.

A device for audio file management provided by the embodiment of the present disclosure will be introduced below with reference to FIG. 4 to FIG. 9 in detail. It is to be noted that the device for audio file management shown in FIG. 4 to FIG. 9 may operate in terminal equipment or a server, and is configured to execute the method for audio file management shown in FIG. 1 to FIG. 3, wherein the terminal equipment may include, but not limited to: a PC, a PAD, a mobile phone, a smart phone and a notebook computer and other equipment.

Figure 4:
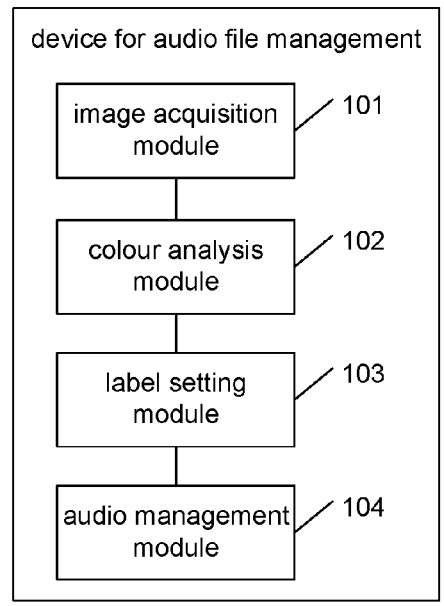
FIG. 4 is a structure diagram of a device for audio file management according to an embodiment of the present disclosure.

FIG. 4 is a structure diagram of a device for audio file management according to an embodiment of the present disclosure. The device may include an image acquisition module 101, a colour analysis module 102, a label setting module 103 and an audio management module 104.

The image acquisition module 101 is configured to acquire an album image corresponding to an audio file to be managed.

Here, the album image corresponding to the audio file refers to any picture of an album to which the audio file belongs. The image acquisition module 101 may acquire the album image corresponding to the audio file to be managed from a network, and the album image acquired by the image acquisition module 101 may preferably refer to a cover picture of the album to which the audio file belongs, or may refer to a picture selected for the audio file in the album to which the audio file belongs.

The colour analysis module 102 is configured to perform colour analysis on the album image to obtain a characteristic colour of the album image.

The characteristic colour of the album image may be configured to reflect a basic colour of the album image. The characteristic colour of the album image may reflect a style attribute of the corresponding audio file to a certain extent, for example: an image in a dark colour (such as black and/or grey) is usually selected as an album image of an audio file of a melancholy style; an image in a neutral colour (such as blue and/or green) is usually selected as an album image of an audio file of a quiet and relaxed style; and an image in a bright colour (such as red and/or yellow) is usually selected as an album image of an audio file of a happy style. The colour analysis module 102 performs colour analysis on the album image to determine the characteristic colour of the album image.

The label setting module 103 is configured to set a colour label for the audio file according to the characteristic colour of the album image.

Here, the colour label includes the characteristic colour of the album image, for example: if the characteristic colour of the album image is green, a green colour label is set for the audio file; or, if the characteristic colour of the album image is red, a red colour label is set for the audio file.

The audio management module 104 is configured to manage the audio file according to the colour label of the audio file.

Since the characteristic colour of the album image may reflect the style attribute of the corresponding audio file to a certain extent, management of the audio management module 104 over the audio file on the basis of the colour label of the audio file may actually be considered as management over the audio file on the basis of the style attribute of the audio file, and such a colour-label-based management manner effectively extends a conventional means of audio file management and improves diversity and intelligence of audio file management.

Figure 5:
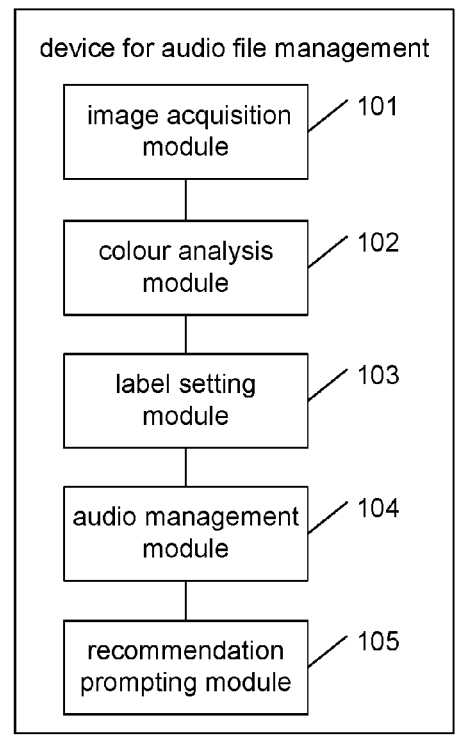
FIG. 5 is a structure diagram of another device for audio file management according to an embodiment of the present disclosure.

FIG. 5 is a structure diagram of another device for audio file management according to an embodiment of the present disclosure. The device may include: an image acquisition module 101, a colour analysis module 102, a label setting module 103, an audio management module 104 and a recommendation prompting module 105, wherein structures and functions of the image acquisition module 101, the colour analysis module 102, the label setting module 103 and the audio management module 104 may refer to related description in the embodiment shown in FIG. 4, and will not be elaborated herein.

The recommendation prompting module 105 is configured to output audio recommendation prompting information according to listening information of a user about an audio library.

The audio recommendation prompting information may be used to prompt the user to listen to a recommended audio file. The recommendation prompting module 105 outputs the audio recommendation prompting information according to the listening information of the user about the audio library, so that a recommended audio is more consistent with a listening habit of the user, and recommendation accuracy is improved.

Each module in the device for audio file management provided by the embodiment of the present disclosure will be introduced below with reference to FIG. 6 to FIG. 9 in detail.

Figure 6A:
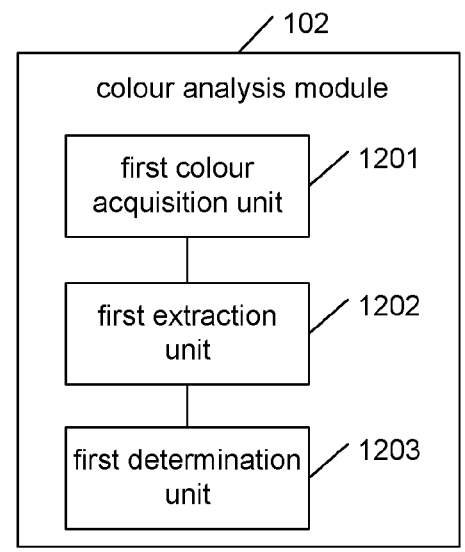
FIG. 6a is a structure diagram of an embodiment of a colour analysis module according to an embodiment of the present disclosure.

FIG. 6a is a structure diagram of an embodiment of a colour analysis module according to an embodiment of the present disclosure. The colour analysis module 102 may include: a first colour acquisition unit 1201, a first extraction unit 1202 and a first determination unit 1203.

The first colour acquisition unit 1201 is configured to acquire colours of specified pixels of the album image.

The album image consists of multiple pixels which are arranged according to information such as positions and colours. Here, a colour of each pixel of the album image may be represented in an RGB format, for example: a colour value of the first pixel of the album image may be represented as $(r_1,g_1,b_1)$, a colour value of the second pixel of the album image may be represented as $(r_2,g_2,b_2)$, and by parity of reasoning, a colour value of the nth (n is a positive integer) pixel of the album image may be represented as $(r_n,g_n,b_n)$. Here, the specified pixels may be all the pixels of the album image, or may also be a part of specified pixels of the album image.

The first extraction unit 1202 is configured to extract the main colour from the colours of the specified pixels of the album image.

Here, the main colour may be used to reflect a basic colour of the album image. The first extraction unit 1202 may extract a preset number of colours from the colours of the specified pixels of the album image as main colours using a colour histogram algorithm, or may also extract the main colour from the colours of the specified pixels of the album image as the main colours using a clustering algorithm, for example, a KNN algorithm.

The first determination unit 1203 is configured to determine the main colour as the characteristic colour of the album image.

Since the main colour may be used to reflect the basic colour of the album image, namely, may be used to reflect a basic colour characteristic of the album image, the first determination unit 1203 may determine the main colour as the characteristic colour of the album image.

Figure 6B:
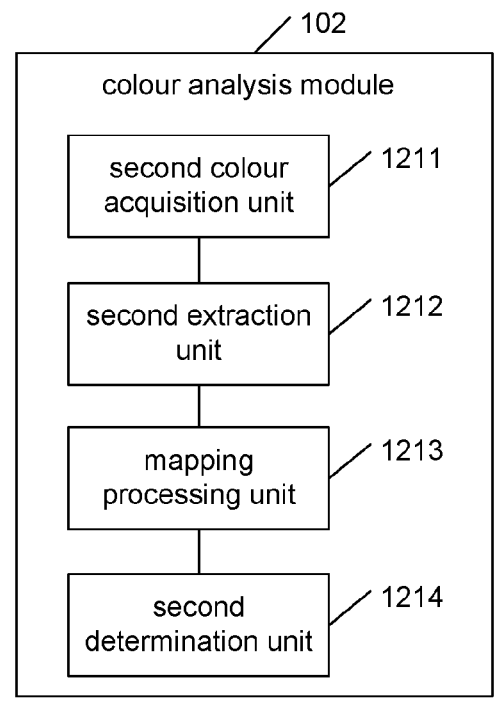
FIG. 6b is a structure diagram of another embodiment of a colour analysis module according to an embodiment of the present disclosure.

FIG. 6b is a structure diagram of another embodiment of a colour analysis module according to an embodiment of the present disclosure. The colour analysis module 102 may include: a second colour acquisition unit 1211, a second extraction unit 1212, a mapping processing unit 1213 and a second determination unit 1214.

The second colour acquisition unit 1211 is configured to acquire colours of specified pixels of the album image.

The second extraction unit 1212 is configured to extract the main colour from the colours of the specified pixels of the album image.

In the embodiment, a structure and function of the second colour acquisition unit 1211 may refer to specific description about a structure and function of the first colour acquisition unit 1201 as shown in FIG. 6a; and a structure and function of the second extraction unit 1212 may refer to specific description about a structure and function of the first extraction unit 1202 as shown in FIG. 6a, and will not be elaborated herein.

The mapping processing unit 1213 is configured to perform mapping processing on the main colour to obtain a mapped colour of the main colour, wherein the mapped colour of the main colour may achieve a better colour display effect compared with the main colour.

The second determination unit 1214 is configured to determine the mapped colour of the main colour as the characteristic colour of the album image.

The second determination unit 1214 may determine the mapped colour of the main colour as the characteristic colour of the album image, so that the style attribute of the audio file may be pertinently represented with personality, and meanwhile, a better colour display effect may be achieved.

Figure 7A:
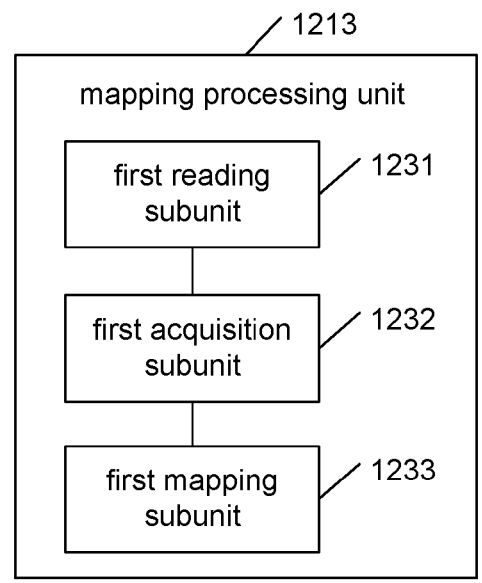
FIG. 7a is a structure diagram of an embodiment of a mapping processing unit according to an embodiment of the present disclosure.

FIG. 7a is a structure diagram of an embodiment of a mapping processing unit according to an embodiment of the present disclosure. The mapping processing unit 1213 may include: a first reading subunit 1231, a first acquisition subunit 1232 and a first mapping subunit 1233.

The first reading subunit 1231 is configured to read a first preset colour mapping table, the first preset colour mapping table including at least one mapped colour and a colour value range of each mapped colour.

The number of the mapped colours in the first preset colour mapping table may be set according to a practical requirement, for example: there may be 12 constellation colours, or there may be 7 specified colours (such as red, orange, yellow, green, cyan, blue and purple). The colour value range of each mapped colour may be represented in the RGB format, for example: a colour value range of a mapped colour green may be represented as ($r_{green}, g_{green}, b_{green}$), and $r_{green} \in (r_x, r_y)$, $g_{green} \in (g_x, g_y)$ and $b_{green} \in (b_x, b_y)$, wherein $r_x < r_y$, $g_x < g_y$ and $b_x < b_y$.

The first acquisition subunit 1232 is configured to acquire a colour value of the main colour.

The colour value of the main colour may be represented in the RGB format, for example: the colour value of the main colour may be represented as ($r_1, g_1, b_1$).

The first mapping subunit 1233 is configured to map the main colour into a mapped colour in the first preset colour mapping table according to the first preset colour mapping table and the colour value of the main colour.

According to the example in the embodiment, if $r_1 \in (r_x, r_y)$, $g_1 \in (g_x, g_y)$ and $b_1 \in (b_x, b_y)$, the first mapping subunit 1233 may map the main colour into green in the first preset colour mapping table.

Figure 7B:
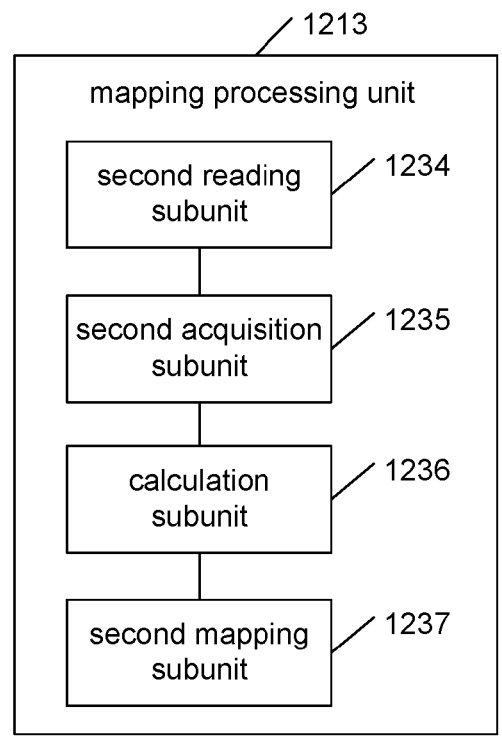
FIG. 7b is a structure diagram of another embodiment of a mapping processing unit according to an embodiment of the present disclosure.

FIG. 7b is a structure diagram of another embodiment of a mapping processing unit according to an embodiment of the present disclosure. The mapping processing unit 1213 may include: a second reading subunit 1234, a second acquisition subunit 1235, a calculation subunit 1236 and a second mapping subunit 1237.

The second reading subunit 1234 is configured to read a second preset colour mapping table, the second preset colour mapping table including at least one mapped colour and a colour value of each mapped colour.

The number of the mapped colours in the second preset colour mapping table may be set according to a practical requirement, for example: there may be 12 constellation colours, or there may be 7 specified colours (such as red, orange, yellow, green, cyan, blue and purple), and so on. The colour value range of each mapped colour may be represented in the RGB format, for example: there are totally 2 mapped colours included in the second preset colour mapping table, wherein a colour value of one mapped colour green may be represented as ($r_{green}, g_{green}, b_{green}$), and a colour value of the other mapped colour red may be represented as ($r_{red}, g_{red}, b_{red}$).

The second acquisition subunit 1235 is configured to acquire a colour value of the main colour.

The colour value of the main colour may be represented in the RGB format, for example: the colour value of the main colour may be represented as ($r_1, g_1, b_1$).

The calculation subunit 1236 is configured to calculate a Euclidean distance between the main colour and each mapped colour in the second preset colour mapping table.

According to the example in the embodiment, the calculation subunit 1236 is required to calculate a Euclidean distance between ($r_1, g_1, b_1$) and each of ($r_{green}, g_{green}, b_{green}$) and ($r_{red}, g_{red}, b_{red}$).

The second mapping subunit 1237 is configured to determine the mapped colour at the shortest Euclidean distance away from the main colour in the second preset colour mapping table as the mapped colour of the main colour.

According to the example in the embodiment, if the Euclidean distance between ($r_1, g_1, b_1$) and ($r_{green}, g_{green}, b_{green}$) is shorter than the Euclidean distance between ($r_1, g_1, b_1$) and ($r_{red}, g_{red}, b_{red}$) the second mapping subunit 1237 maps the main colour represented as ($r_1, g_1, b_1$) into green in the second preset colour mapping table.

Figure 8:
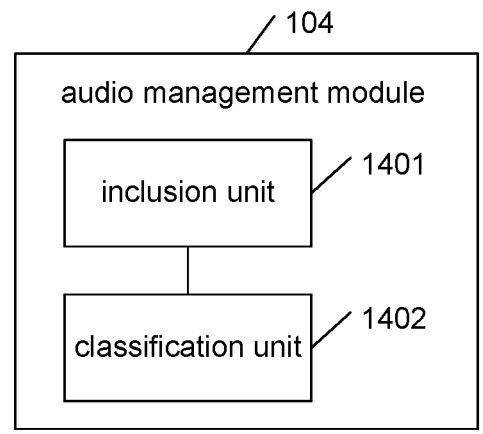
FIG. 8 is a structure diagram of an embodiment of an audio management module according to an embodiment of the present disclosure.

FIG. 8 is a structure diagram of an embodiment of an audio management module according to an embodiment of the present disclosure. The audio management module 104 may include: an inclusion unit 1401 and a classification unit 1402.

The inclusion unit 1401 is configured to include the audio file in an audio library.

Here, the audio library refers to a database used to store audio files, and the audio library may refer to an audio library located in a storage space of a network server, or may also refer to an audio library located in a storage space of the terminal equipment. Since the colour label has been set for the audio file, an inclusion process of the inclusion unit 1401 may adopt the following two implementation modes according to a practical condition of the audio library, wherein one implementation mode is that if the audio file has been included in the audio library, the inclusion process of the inclusion unit 1401 may include that the colour label is added to the audio file in the audio library; and the other implementation mode is that if the audio file has not been included in the audio library, the inclusion process of the inclusion unit 1401 may include that the audio file with the colour label is stored in the audio library.

The classification unit 1402 is configured to classify the audio file into an audio category corresponding to the colour label of the audio file in the audio library according to a preset correspondence between a colour label and an audio category.

Here, the preset correspondence between a colour label and an audio category is that: one colour label corresponds to one audio category. It may be understood that there may exist multiple audio files in the audio library, and the classification unit 1402 classifies each audio file according to the colour label of each audio file, thereby implementing classified management over the whole audio library on the basis of the colour label of each audio file.

Figure 9:
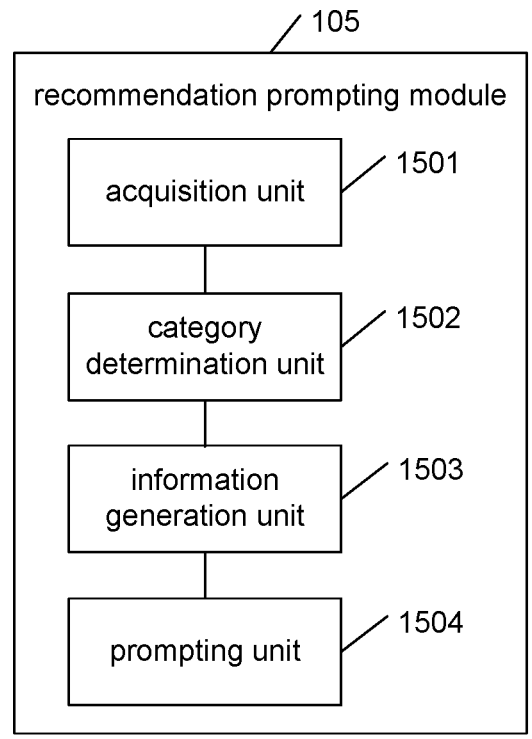
FIG. 9 is a structure diagram of an embodiment of a recommendation prompting module according to an embodiment of the present disclosure.

FIG. 9 is a structure diagram of an embodiment of a recommendation prompting module according to an embodiment of the present disclosure. The recommendation prompting module 105 may include: an acquisition unit 1501, a category determination unit 1502, an information generation unit 1503 and a prompting unit 1504.

The acquisition unit 1501 is configured to acquire listening information of the user about the audio files in the audio library, the listening information containing the colour labels of the audio files to which the user listens.

An acquisition process of the acquisition unit 1501 may include that: listening records of the user about the audio files in the audio library are recorded, that is, the audio files to which the user listen in the audio library are recorded; and then the audio library is searched for the colour label of each audio file to which the user listens to obtain the listening information.

The category determination unit 1502 is configured to determine an audio category that the user follows according to the colour labels of the audio files to which the user listens in the listening information.

The category determination unit 1502 may adopt a statistical algorithm to determine the audio category that the user follows, and specifically: the category determination unit 1502 adopts the statistical algorithm to make statistics about the number of colour labels of each type according to the colour labels of the audio files to which the user listens in the listening information, and determines an audio category corresponding to the colour labels in the largest number as the audio category that the user follows. For example: if the user listens to 1,000 audio files in the audio library, that is, the listening information contains colour labels of the 1,000 audio files, the category determination unit 1502 may make statistics about the number of colour labels of each type in the 1,000 colour labels, and if a statistical result shows that there are totally 500 green colour labels, 300 red colour labels, 100 blue colour labels, 50 black colour labels and 50 yellow colour labels, the category determination unit 1502 may determine the audio category that the user follows to be an audio category corresponding to the green colour labels.

The information generation unit 1503 is configured to select at least one audio file from the audio category that the user follows to generate audio recommendation prompting information.

The information generation unit 1503 may select at least one audio file from the audio category that the user follows to generate the audio recommendation prompting information, or, may also select at least one specified audio file from the audio category that the user follows to generate audio recommendation prompting information according to an operation requirement.

The prompting unit 1504 is configured to output the audio recommendation prompting information.

It is to be noted that the user may listen to the recommended audio file according to the audio recommendation prompting information after the prompting unit 1504 outputs the audio recommendation prompting information.

From the description about the embodiments shown in FIG. 4 to FIG. 9, the embodiment of the present disclosure may set the colour label of the audio file according to the characteristic colour of the album image corresponding to the audio file, and implement management over the audio file on the basis of the colour label; since the characteristic colour of the album image may reflect the style attribute of the corresponding audio file to a certain extent, managing the audio file on the basis of the colour label including the characteristic colour effectively improves the diversity and intelligence of the means of audio file management.

Figure 10:
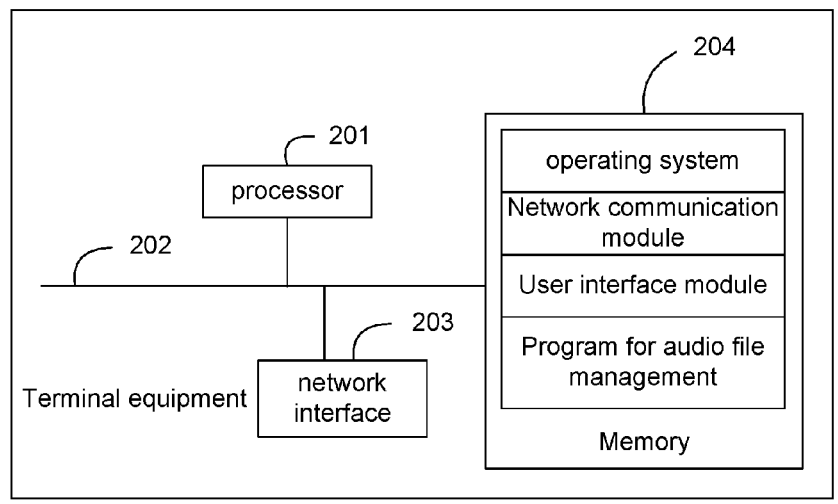
FIG. 10 is a structure diagram of terminal equipment according to an embodiment of the present disclosure.

FIG. 10 is a structure diagram of terminal equipment according to an embodiment of the present disclosure. The terminal equipment of the embodiment of the present disclosure may include, but not limited to: equipment such as a PC, a PAD, a mobile terminal, a smart phone or a notebook computer, and the terminal equipment includes: at least one processor 201, for example, a Central Processing Unit (CPU), at least one communication bus 202, at least one network interface 203 and a memory 204. Here, the communication bus 202 is configured to implement connection communication among these components. Here, the network interface 203 may optionally include a standard wired interface and/or wireless interface (such as a Wireless Fidelity (WI-FI) and/or mobile communication interface). The memory 204 may be a high-speed Random Access Memory (RAM), or may also be a non-volatile memory, for example, at least one disk memory. The memory 204 may optionally be at least one storage device located far away from the processor 201. As shown in FIG. 10, the memory 204, serving as a computer storage medium, stores an operating system and a network communication module, and also stores a program configured to manage an audio file and other programs.

Here, the processor 201 may specifically be configured to call the program which is stored in the memory 204 and configured to manage the audio file to execute the following steps that:

an album image corresponding to an audio file to be managed is acquired;

colour analysis is performed on the album image to obtain a characteristic colour of the album image;

a colour label is set for the audio file according to the characteristic colour of the album image; and the audio file is managed according to the colour label of the audio file.

Furthermore, when executing the step that colour analysis is performed on the album image to obtain the characteristic colour of the album image, the processor 201 specifically executes the following steps that:

colours of specified pixels of the album image are acquired;

a main colour is extracted from the colours of the specified pixels of the album image; and the main colour is determined as the characteristic colour of the album image.

Or furthermore, when executing the step that colour analysis is performed on the album image to obtain the characteristic colour of the album image, the processor 201 specifically executes the following steps that:

the colours of the specified pixels of the album image are acquired;

the main colour is extracted from the colours of the specified pixels of the album image;

mapping processing is performed on the main colour to obtain a mapped colour of the main colour; and the mapped colour of the main colour is determined as the characteristic colour of the album image.

Furthermore, when executing the step that mapping processing is performed on the main colour to obtain the mapped colour of the main colour, the processor 201 specifically executes the following steps that:

a first preset colour mapping table is read, the first preset colour mapping table including at least one mapped colour and a colour value range of each mapped colour;

a colour value of the main colour is acquired; and the main colour is mapped into a mapped colour in the first preset colour mapping table according to the first preset colour mapping table and the colour value of the main colour.

Or furthermore, when executing the step that mapping processing is performed on the main colour to obtain the mapped colour of the main colour, the processor 201 specifically executes the following steps that:

a second preset colour mapping table is read, the second preset colour mapping table including at least one mapped colour and a colour value of each mapped colour;

the colour value of the main colour is acquired;

a Euclidean distance between the main colour and the each mapped colour in the second preset colour mapping table is calculated; and the mapped colour at the shortest Euclidean distance away from the main colour in the second preset colour mapping table is determined as the mapped colour of the main colour.

Furthermore, when executing the step that the audio file is managed according to the colour label of the audio file, the processor 201 specifically executes the following steps that:

the audio file is included in an audio library; and the audio file is classified into an audio category corresponding to the colour label of the audio file in the audio library according to a preset correspondence between a colour label and an audio category, wherein the preset correspondence between a colour label and an audio category is that: one colour label corresponds to one audio category.

Furthermore, after executing the step that the audio file is managed according to the colour label of the audio file, the processor 201 may further execute the following step that: audio recommendation prompting information is output according to listening information of a user about the audio library.

Furthermore, when executing the step that the audio recommendation prompting information is output according to the listening information of the user about the audio library, the processor 201 specifically executes the following steps that:

listening information of the user about audio files in the audio library is acquired, the listening information containing colour labels of the audio files to which the user listens;

an audio category that the user follows is determined according to the colour labels of the audio files to which the user listens in the listening information;

at least one audio file is selected from the audio category that the user follows to generate audio recommendation prompting information; and the audio recommendation prompting information is output.

According to the embodiment of the present disclosure, the colour label of the audio file may be set according to the characteristic colour of the album image corresponding to the audio file, and the audio file may be managed on the basis of the colour label; since the characteristic colour of the album image may reflect a style attribute of the corresponding audio file to a certain extent, managing the audio file on the basis of the colour label including the characteristic colour effectively improves diversity and intelligence of the means of audio file management.

Figure 11:
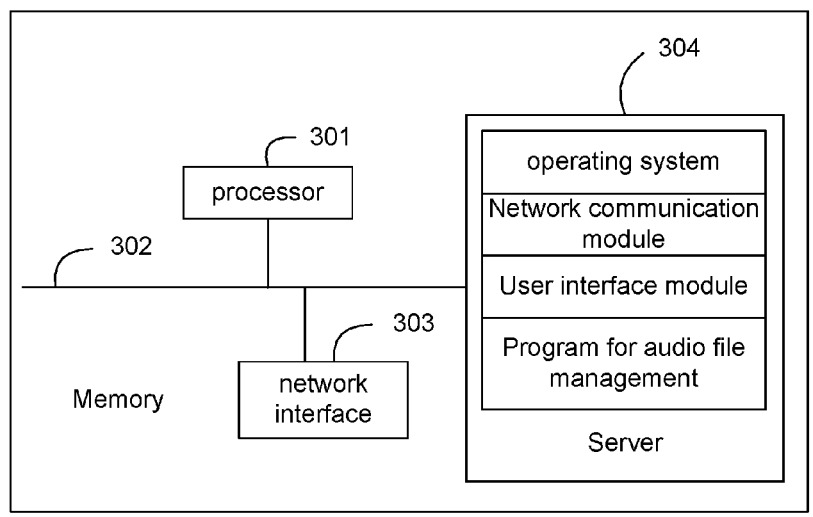
FIG. 11 is a structure diagram of a server according to an embodiment of the present disclosure.

FIG. 11 is a structure diagram of a server according to an embodiment of the present disclosure. The server of the embodiment of the present disclosure includes: at least one processor 301, for example, a CPU, at least one communication bus 302, at least one network interface 303 and a memory 304. Here, the communication bus 302 is configured to implement connection communication among these components. Here, the network interface 303 may optionally include a standard wired interface and/or a wireless interface (such as a WI-FI and/or a mobile communication interface). The memory 304 may be a high-speed RAM, or may also be a non-volatile memory, for example, at least one disk memory. The memory 304 may optionally be at least one storage device located far away from the processor 301. As shown in FIG. 11, the memory 304, serving as a computer storage medium, stores an operating system and a network communication module, and also stores a program configured to manage an audio file and other programs.

Here, the processor 301 may specifically be configured to call the program which is stored in the memory 304 and configured to manage the audio file to execute the following steps that:

an album image corresponding to an audio file to be managed is acquired;

colour analysis is performed on the album image to obtain a characteristic colour of the album image;

a colour label is set for the audio file according to the characteristic colour of the album image; and the audio file is managed according to the colour label of the audio file.

Furthermore, when executing the step that colour analysis is performed on the album image to obtain the characteristic colour of the album image, the processor 301 specifically executes the following steps that:

colours of specified pixels of the album image are acquired;

a main colour is extracted from the colours of the specified pixels of the album image; and the main colour is determined as the characteristic colour of the album image.

Or furthermore, when executing the step that colour analysis is performed on the album image to obtain the characteristic colour of the album image, the processor 301 specifically executes the following steps that:

the colours of the specified pixels of the album image are acquired;

the main colour is extracted from the colours of the specified pixels of the album image;

mapping processing is performed on the main colour to obtain a mapped colour of the main colour; and the mapped colour of the main colour is determined as the characteristic colour of the album image.

Furthermore, when executing the step that mapping processing is performed on the main colour to obtain the mapped colour of the main colour, the processor 301 specifically executes the following steps that:

a first preset colour mapping table is read, the first preset colour mapping table including at least one mapped colour and a colour value range of each mapped colour;

a colour value of the main colour is acquired; and the main colour is mapped into a mapped colour in the first preset colour mapping table according to the first preset colour mapping table and the colour value of the main colour.

Or furthermore, when executing the step that mapping processing is performed on the main colour to obtain the mapped colour of the main colour, the processor 301 specifically executes the following steps that:

a second preset colour mapping table is read, the second preset colour mapping table including at least one mapped colour and a colour value of each mapped colour;

the colour value of the main colour is acquired;

a Euclidean distance between the main colour and the each mapped colour in the second preset colour mapping table is calculated; and the mapped colour at the shortest Euclidean distance away from the main colour in the second preset colour mapping table is determined as the mapped colour of the main colour.

Furthermore, when executing the step that the audio file is managed according to the colour label of the audio file, the processor 301 specifically executes the following steps that:

the audio file is included in an audio library; and the audio file is classified into an audio category corresponding to the colour label of the audio file in the audio library according to a preset correspondence between a colour label and an audio category, wherein the preset correspondence between a colour label and an audio category is that: one colour label corresponds to one audio category.

Furthermore, after executing the step that the audio file is managed according to the colour label of the audio file, the processor 301 may further execute the following step that: audio recommendation prompting information is output according to listening information of a user about the audio library.

Furthermore, when executing the step that the audio recommendation prompting information is output according to the listening information of the user about the audio library, the processor 301 specifically executes the following steps that:

listening information of the user about audio files in the audio library is acquired, the listening information containing colour labels of the audio files to which the user listens;

an audio category that the user follows is determined according to the colour labels of the audio files to which the user listens in the listening information;

at least one audio file is selected from the audio category that the user follows to generate audio recommendation prompting information; and the audio recommendation prompting information is output.

According to the embodiment of the present disclosure, the colour label of the audio file may be set according to the characteristic colour of the album image corresponding to the audio file, and the audio file may be managed on the basis of the colour label; since the characteristic colour of the album image may reflect a style attribute of the corresponding audio file to a certain extent, managing the audio file on the basis of the colour label including the characteristic colour effectively improves diversity and intelligence of the means of audio file management.

An embodiment of the present disclosure further provides a storage medium including a computer-executable instruction, the computer-executable instruction being executed by a computer processor to execute a method for audio file management, the method including that:

an album image corresponding to an audio file to be managed is acquired;

colour analysis is performed on the album image to obtain a characteristic colour of the album image;

a colour label is set for the audio file according to the characteristic colour of the album image; and the audio file is managed according to the colour label of the audio file.

Furthermore, the step that colour analysis is performed on the album image to obtain the characteristic colour of the album image includes that:

colours of specified pixels of the album image are acquired;

a main colour is extracted from the colours of the specified pixels of the album image; and the main colour is determined as the characteristic colour of the album image.

Furthermore, the step that colour analysis is performed on the album image to obtain the characteristic colour of the album image includes that:

the colours of the specified pixels of the album image are acquired;

the main colour is extracted from the colours of the specified pixels of the album image;

mapping processing is performed on the main colour to obtain a mapped colour of the main colour; and the mapped colour of the main colour is determined as the characteristic colour of the album image.

Furthermore, the step that mapping processing is performed on the main colour to obtain the mapped colour of the main colour includes that:

a first preset colour mapping table is read, the first preset colour mapping table including at least one mapped colour and a colour value range of each mapped colour;

a colour value of the main colour is acquired; and the main colour is mapped into a mapped colour in the first preset colour mapping table according to the first preset colour mapping table and the colour value of the main colour.

Furthermore, the step that mapping processing is performed on the main colour to obtain the mapped colour of the main colour includes that:

a second preset colour mapping table is read, the second preset colour mapping table including at least one mapped colour and a colour value of each mapped colour;

the colour value of the main colour is acquired;

a Euclidean distance between the main colour and each mapped colour in the second preset colour mapping table is calculated; and the mapped colour at the shortest Euclidean distance away from the main colour in the second preset colour mapping table is determined as the mapped colour of the main colour.

Furthermore, the step that the audio file is managed according to the colour label of the audio file includes that:

the audio file is included in an audio library; and the audio file is classified into an audio category corresponding to the colour label of the audio file in the audio library according to a preset correspondence between a colour label and an audio category, wherein the preset correspondence between a colour label and an audio category is that: one colour label corresponds to one audio category.

Furthermore, after the step that the audio file is managed according to the colour label of the audio file, the method further includes that:

audio recommendation prompting information is output according to listening information of a user about the audio library.

Furthermore, the step that the audio recommendation prompting information is output according to the listening information of the user about the audio library includes that:

listening information of the user about audio files in the audio library is acquired, the listening information containing colour labels of the audio files to which the user listens;

an audio category that the user follows is determined according to the colour labels of the audio files to which the user listens in the listening information;

at least one audio file is selected from the audio category that the user follows to generate audio recommendation prompting information; and the audio recommendation prompting information is output.

Those skilled in the art should know that all or part of flows in the methods of the embodiments may be implemented by related hardware instructed by a computer program, the program may be stored in a computer-readable storage medium, and execution of the program may include the flows of each method embodiment. Here, the storage medium may be a magnetic disc, a compact disc, a Read-Only Memory (ROM), a RAM or the like.

The above is only the preferred embodiments of the present disclosure and certainly not intended to limit the scope of the present disclosure. Therefore, equivalent variations made according to claims of the present disclosure shall still fall within the scope of the present disclosure.

What is claimed is:
1. A method for audio file management, comprising:
acquiring an album image corresponding to an audio file to be managed;
performing colour analysis on the album image to obtain a characteristic colour of the album image;

setting a colour label for the audio file according to the characteristic colour of the album image; and managing the audio file according to the colour label of the audio file.

2. The method according to claim 1, wherein performing colour analysis on the album image to obtain the characteristic colour of the album image comprises:

acquiring colours of specified pixels of the album image;

extracting a main colour from the colours of the specified pixels of the album image; and determining the main colour as the characteristic colour of the album image.

3. The method according to claim 1, wherein performing colour analysis on the album image to obtain the characteristic colour of the album image comprises:

acquiring colours of specified pixels of the album image;

extracting a main colour from the colours of the specified pixels of the album image;

performing mapping processing on the main colour to obtain a mapped colour of the main colour; and determining the mapped colour of the main colour as the characteristic colour of the album image.

4. The method according to claim 3, wherein performing mapping processing on the main colour to obtain the mapped colour of the main colour comprises:

reading a first preset colour mapping table, the first preset colour mapping table comprising at least one mapped colour and a colour value range of each mapped colour;

acquiring a colour value of the main colour; and mapping the main colour into a mapped colour in the first preset colour mapping table according to the first preset colour mapping table and the colour value of the main colour.

5. The method according to claim 3, wherein performing mapping processing on the main colour to obtain the mapped colour of the main colour comprises:

reading a second preset colour mapping table, the second preset colour mapping table comprising at least one mapped colour and a colour value of each mapped colour;

acquiring a colour value of the main colour;

calculating a Euclidean distance between the main colour and the each mapped colour in the second preset colour mapping table; and determining a mapped colour at a shortest Euclidean distance away from the main colour in the second preset colour mapping table as the mapped colour of the main colour.

6. The method according to claim 1, wherein managing the audio file according to the colour label of the audio file comprises:

including the audio file in an audio library; and classifying the audio file into an audio category corresponding to the colour label of the audio file in the audio library according to a preset correspondence between a colour label and an audio category, wherein the preset correspondence between a colour label and an audio category is that: one colour label corresponds to one audio category.

7. The method according to claim 6, after managing the audio file according to the colour label of the audio file, the method further comprising:

outputting audio recommendation prompting information according to listening information of a user about the audio library.

8. The method according to claim 7, wherein outputting the audio recommendation prompting information according to the listening information of the user about the audio library comprises:

acquiring listening information of the user about audio files in the audio library, the listening information containing colour labels of the audio files to which the user listens;

determining an audio category that the user follows according to the colour labels of the audio files to which the user listens in the listening information;

selecting at least one audio file from the audio category that the user follows to generate audio recommendation prompting information; and outputting the audio recommendation prompting information.

9. A device for audio file management, comprising:

a processor; and a memory configured to store instructions executable by the processor, wherein the processor is configured to:

acquire an album image corresponding to an audio file to be managed;

perform colour analysis on the album image to obtain a characteristic colour of the album image;

set a colour label for the audio file according to the characteristic colour of the album image; and manage the audio file according to the colour label of the audio file.

10. The device according to claim 9, wherein the processor is further configured to:

acquire colours of specified pixels of the album image;

extract a main colour from the colours of the specified pixels of the album image; and determine the main colour as the characteristic colour of the album image.

11. The device according to claim 9, wherein the processor is further configured to:

acquire colours of specified pixels of the album image;

extract a main colour from the colours of the specified pixels of the album image;

perform mapping processing on the main colour to obtain a mapped colour of the main colour; and determine the mapped colour of the main colour as the characteristic colour of the album image.

12. The device according to claim 11, wherein the processor is further configured to:

read a first preset colour mapping table, the first preset colour mapping table comprising at least one mapped colour and a colour value range of each mapped colour;

acquire a colour value of the main colour; and map the main colour into a mapped colour in the first preset colour mapping table according to the first preset colour mapping table and the colour value of the main colour.

13. The device according to claim 11, wherein the processor is further configured to:

read a second preset colour mapping table, the second preset colour mapping table comprising at least one mapped colour and a colour value of each mapped colour;

acquire a colour value of the main colour;

calculate a Euclidean distance between the main colour and the each mapped colour in the second preset colour mapping table; and determine a mapped colour at a shortest Euclidean distance away from the main colour in the second preset colour mapping table as the mapped colour of the main colour.

14. The device according to claim 9, wherein the processor is further configured to:
include the audio file in an audio library; and
classify the audio file into an audio category corresponding to the colour label of the audio file in the audio library according to a preset correspondence between a colour label and an audio category,
wherein the preset correspondence between a colour label and an audio category is that: one colour label corresponds to one audio category.

15. The device according to claim 14, wherein the processor is further configured to:
output audio recommendation prompting information according to listening information of a user about the audio library.

16. The device according to claim 15, wherein the processor is further configured to:
acquire listening information of the user about audio files in the audio library, the listening information containing colour labels of the audio files to which the user listens;
determine an audio category that the user follows according to the colour labels of the audio files to which the user listens in the listening information;
select at least one audio file from the audio category that the user follows to generate audio recommendation prompting information; and
output the audio recommendation prompting information.

17. A non-transitory computer-readable storage medium comprising a computer-executable instruction, the computer-executable instruction being executed by a computer processor to execute a method for audio file management, wherein the method comprises:
acquiring an album image corresponding to an audio file to be managed;
performing colour analysis on the album image to obtain a characteristic colour of the album image;
setting a colour label for the audio file according to the characteristic colour of the album image; and
managing the audio file according to the colour label of the audio file.

18. The non-transitory computer-readable storage medium according to claim 17, wherein performing colour analysis on the album image to obtain the characteristic colour of the album image comprises:
acquiring colours of specified pixels of the album image;
extracting a main colour from the colours of the specified pixels of the album image; and
determining the main colour as the characteristic colour of the album image.

19. The non-transitory computer-readable storage medium according to claim 17, wherein performing colour analysis on the album image to obtain the characteristic colour of the album image comprises:
acquiring colours of specified pixels of the album image;
extracting a main colour from the colours of the specified pixels of the album image;
performing mapping processing on the main colour to obtain a mapped colour of the main colour; and
determining the mapped colour of the main colour as the characteristic colour of the album image.

20. The non-transitory computer-readable storage medium according to claim 19, wherein performing mapping processing on the main colour to obtain the mapped colour of the main colour comprises:
reading a first preset colour mapping table, the first preset colour mapping table comprising at least one mapped colour and a colour value range of each mapped colour;
acquiring a colour value of the main colour; and
mapping the main colour into a mapped colour in the first preset colour mapping table according to the first preset colour mapping table and the colour value of the main colour.

* * * * *